Jan. 30, 1951     N. E. LEE     2,539,443

MOUNTING

Filed June 7, 1945

*INVENTOR.*
NORMAN E. LEE

BY

ATTORNEY

UNITED STATES PATENT OFFICE 2,539,443

MOUNTING

Norman E. Lee, Forest Hills, N. Y.

Application June 7, 1945, Serial No. 598,198

11 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent or at least minimize the transmission of vibrations, shocks and noises from said load to said base and vice versa.

Some installations require mounts which will protect against a number of different kinds of impulses. For instance, in aircraft sensitive apparatus must be shielded from forced vibrations of the engines and associated parts, at various speeds including that at which there are generated vibrations of the resonant frequency of the mounted equipment, and also from relatively mild shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies, vibrations due to substantially uniform, minor irregularities of the road beds traversed by the vehicles, which usually have abrupt waveforms, and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections only in one direction of movement, such as vertical, and are therefore unsuited to installations requiring attenuation in several directions, as both vertical and horizontal.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

Some supports, having hydraulic systems comprising a cylinder and a piston operating therein, have excellent vibration damping characteristics but are relatively large in size and are expensive to manufacture and maintain, and they also are subject to leakage of the hydraulic medium therefrom. In addition, they are generally good in only one direction and they require a spring system separate from the hydraulic system.

In some mounts, oscillations persist and add to later oscillations so as to amplify rather than reduce them.

It is intended by the present invention to provide shock and vibration supports which are not attended by defects of earlier mounts.

It is an object of the present invention to provide means of supporting equipment which will be soft and resilient enough to isolate high frequency vibrations, and which will also damp and absorb vibrations in the resonant frequency range as well as shocks of relatively large force and amplitude.

It is another object to provide a mount which incorporates both a shock absorbing system and a spring system in a single unit.

It is still another object to provide such supports wherein the operation of the absorbing system follows from the action of the spring system, and wherein the shock absorbing characteristics may be made to follow optimum values by changing the hydraulic action during operation.

It is a still further object to provide such mounts wherein natural rubber or a similar material may be used as the spring system and wherein deformations of said material are utilized to accelerate the functioning of the shock absorption system.

It is a further object to provide supporting means which will cushion displacements in different directions, such as in vertical, horizontal and rotational.

Another object is to employ hydraulic damping in mounting devices which are so designed that they will not suffer from leakage of the hydraulic medium, which will be small in size relative to earlier hydraulic mounts, which will not incorporate solid, nonresilient parts moving against each other with resultant wear, and changes in operating characteristics and replacement of parts.

It is still another object to provide mounts in which the hydraulic medium is confined in extensible chambers which provide the necessary volumetric capacity for the medium under different conditions of operation.

Still another object is to provide mounts, the external dimensions of which allow them to be substituted for presently manufactured mounts without necessitating structural changes in either the base or the load.

A still further object is to provide mounts designed to absorb and attenuate shocks to such a degree as to eliminate the need of snubbers and thereby avoid the violent countershocks frequently caused thereby.

It is still another object to provide mounts wherein metal to metal contacts are eliminated and hence the transfer of sound, as well as vibration and shock, is inhibited.

The foregoing objects, and others which will become clear from the following specification, are accomplished by a mount embodying the present invention. Generally, the embodiment of the present invention, as illustrated in the drawings, comprises a load spool, including two parallel load plates joined by a tubular core; a base plate, having a large central opening, interposed between and parallel to said load plates; two tubular, inwardly bowed, flexible, spring members, interposed respectively between the base plate and each of the load plates and secured to said plates, so as to form two chambers, respectively above and below said base plate; a substantially tire-shaped spring collar, interposed between the inner marginal edge of the base plate and the core; restricted orifices interconnecting said chambers; means, if desired, to vary the size of said orifices during operation; and a hydraulic medium in said chambers; so that longitudinal oscillations of the load spool relative to the base plate cause alternate flexure and tension of the spring members aforementioned and force the hydraulic medium back and forth from one chamber to the other through the said restricted orifices, and lateral oscillations of said load spool relative to said base plate cause flexure of said spring collar.

In the accompanying drawings (wherein, for clarity, the hydraulic medium is not shown), Figure 1 is a plan view of a preferred form of mounting embodying the present invention, shown in its normal, at rest, condition, a portion of the upper load plate being broken away to show the interior of the mount;

Figure 1:
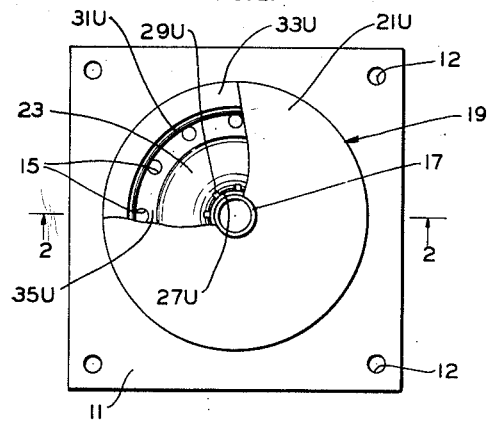
Figure 5:
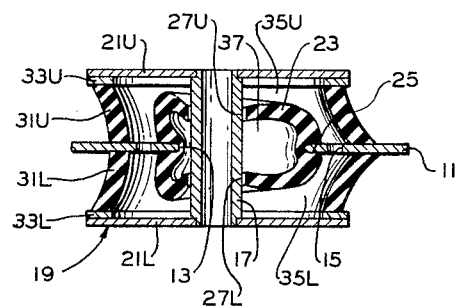
Figure 3:
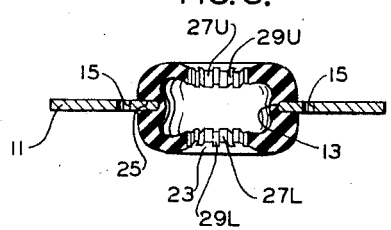
Figure 3 is a sectional view of the base plate and spring collar of Figure 2.
Figure 6:
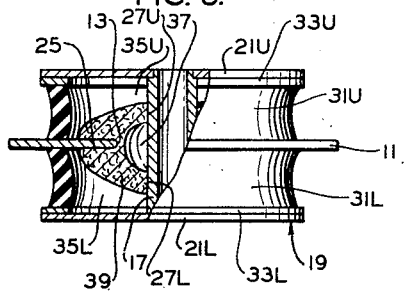

Figure 5 is a cross sectional view, along the line 2—2 of Figure 1, the parts being shown in their condition when the base plate is laterally deflected toward the right; and Figure 6 is an elevational view, partly vertically sectioned, of a modified form of mount, which is similar to the mount shown in the other figures, except that the fixed orifices through the base plate are eliminated entirely and a permeable throttling collar, of felt or the like, is substituted for the spring collar shown in the other views.

Referring now particularly to Figures 1–5, the form of mounting there shown includes a horizontally disposed base plate 11, which is square in outside configuration and is pierced by four corner holes 12 receivable to bolts or other fastening means (not shown). Said base plate 11 is provided with a circular central opening 13 and is pierced by several small fixed orifices 15 arranged in a circle concentric with said central opening 13.

Extending concentrically through the opening 13 is a vertically disposed, tubular, metal core 17 of a load spool 19. Secured to the ends of said core 17 are horizontally disposed, upper and lower load plates 21U, 21L. Said load plates 21U, 21L may be joined to said core 17 by welding or any other suitable means.

Encircling the core 17, and coaxial therewith, is a spring collar 23, which is made of resilient flexible material, such as natural or synthetic rubber, and which is shaped substantially like a vehicular tire. Said spring collar 23 is provided with a horizontal slot 25 about its outer periphery, into which slot is positioned the inner peripheral portion of the base plate 11. Said base plate is preferably permanently bonded in said slot 25. The upper and lower rims 27U, 27L of the spring collar encircle the core 17 and make a snug sliding fit thereabout. Each of said rims 27U, 27L is provided with several vertically disposed notches 29U, 29L, which form variable orifices.

Positioned above the base plate 11 is an upper spring member 31U, of a resilient flexible material, such as natural or synthetic rubber, which is generally tubular in shape and is bowed inwardly throughout its central portion. Its lower end is secured, as by a metal to rubber bond, to the upper surface of the base plate 11, outside the circle of orifices 15. Its upper end is secured to the lower surface of an upper circular metal washer 33U, the upper surface of which washer 33U is joined to the lower surface of the upper load plate 21U, as by welding or in any other suitable manner to make a seal against leakage of the hydraulic medium hereinafter referred to. A similar lower spring member 31L is likewise secured to the base plate 11 and a similar lower circular metal washer 33L, which washer 33L is similarly joined to the lower load plate 21L.

It will thus be seen that the structure described contains three intercommunicating chambers, the upper and lower chambers 35U, 35L and the intermediate chamber 37, each of which chambers 35U, 35L, 37 is generally annular in shape. The upper and lower chambers 35U, 35L communicate with each other through the fixed orifices 15 and also, by way of the intermediate chamber 37, through the upper and lower variable orifices 29U, 29L. Said chambers 35U, 35L, 37 are filled with a suitable hydraulic medium (not shown in the drawings), which may be a liquid, such as a viscous oil or the like, or a gas, such as air, or a combination of liquid and gas.

The modification of the present invention, shown in Figure 6, is similar in all details to the embodiment already described (Figures 1–5), except that the fixed orifices 15 are omitted entirely and a throttling collar 39 is substituted for the spring collar 23. Said throttling collar 39 is made up of a permeable, resilient, flexible material, which is pierced by a maze of extremely fine circuitous pores, such as felt, or possibly very fine foam rubber. The said pores take the place of the variable orifices 29U, 29L of the first embodiment. In this modified embodiment, the chambers 35U, 35L intercommunicate only by way of the chamber 37 through the tiny pores in the throttling collar 39.

In describing the mountings aforesaid, it will be assumed that they are being used to mount a radio set (not shown) in a motor vehicle (not shown). The base plate 11 would then be secured to the vehicle, by means of bolts (not shown) through the holes 12, and the radio set would be secured to the load spool 19, by means of a bolt (not shown) through the hole in the core 17.

In the case of the first embodiment (Figures 1–5), as the motor vehicle is operated, the base plate 11 is subjected to vertical oscillations, resulting in vertical movements of the base plate 11 relative to the load spool 19. As the base plate 11 is translated vertically, the spring members 31U, 31L are alternately flexed inwardly (as indicated in the upper portion of Figure 4) and subjected to tension (as indicated in the lower portion of Figure 4) and at the same time the hydraulic medium is forced to flow back and forth between the chambers 35U, 35L through the fixed orifices 15 and variable orifices 29U, 29L.

Figure 4:
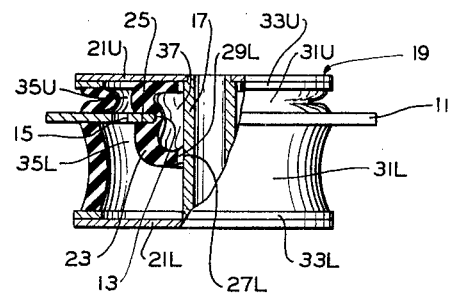
Figure 4 is a view similar to Figure 2, except that the parts are shown as they are when the base plate is in an upwardly deflected position.
Figure 2:
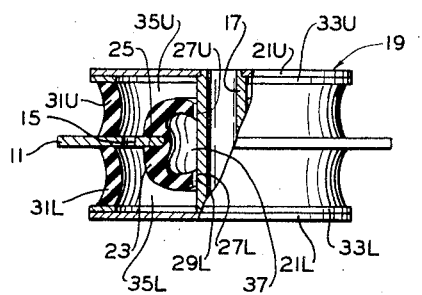
Figure 2 is an elevational view, partly sectioned along the line 2—2, of the mounting of Figure 1.

Figure 4 shows the mount when the base plate 11 is deflected upwardly almost to its extreme upward position. The upper wall of the spring collar 23 is then squeezed against the upper load plate 21U so as to stop any flow of hydraulic medium through the variable orifices 29U and, hence, any flow of said medium between the chambers 35U, 35L must be through the fixed orifices 15. During such extreme vertical deflections, either the upper or lower half of the spring collar 23 is also subjected to some flexure.

Horizontal oscillations of the base plate 11 (as illustrated in Figure 5) will cause radial flexure of the spring collar 23 to one side of the core 17 (as shown to the left in said figure), will also cause radial tension of the said spring collar 23 to the other side of said core 17 (as shown to the right in said figure), and will also subject the spring members 31U, 31L to a shearing stress.

The modified mount, shown in Figure 6, is designed particularly for use with a low viscosity liquid or a gaseous hydraulic medium. Forcing such a medium through the permeable material of the throttling collar 39 causes a turbulence and generates heat so that considerable energy is thereby dissipated. In this modified embodiment, the operation is similar to the first embodiment except that the hydraulic medium must pass through the pores of the throttling collar 39 in passing between the chambers 35U, 35L. When extreme vertical deflections of the base plate occur the passage of the hydraulic medium through the throttling collar 39 is not stopped entirely, but it is considerably curtailed as the throttling collar 39 is flexed and squeezed against one of the load plates 21U, 21L. Thus, it is seen that, toward the end of a vertical stroke, there is an increase in the damping effect analogous to the increase already described in connection with the first embodiment.

In the case of lateral deflections of the modified embodiment (Figure 6) the throttling collar 39 will be radially flexed to one side of the core 17 and subjected to tension to the other side thereof and the spring members 31U, 31L will be put into shear.

If the spring members 31U, 31L are sufficiently thin and are of a rather flexible compound, the mounting will be soft, which is particularly advantageous for the attenuation of vibrations of high frequency. Despite this softness of the spring system, the mounting described will, nevertheless, be capable of absorbing and dissipating low frequency vibrations and particularly those in the resonant frequency range of the suspended load, and shocks of considerable force and amplitude. The soft spring system described might not alone be able to protect the load against such destructive energy whereas, in combination with the hydraulic damping system, it does the job effectively.

The steady energy absorption by the hydraulic system, combined with the increasing recovery force stored up in the spring system, as the amplitude of deflection increases, results in a time lag in the deflection, thereby keeping the amplitude of deflection within the predetermined limits of a particular mount. Thus, by a steadily increasing storage and absorption of energy, the vibrations and shocks are attenuated without the use of snubbers, which may act with an injurious abruptness.

It is to be noted that vertical deflections of considerable amplitude tend to reduce the total volumetric capacity of the three chambers 35U, 35L, 37. If an incompressible hydraulic medium is being used, the said total volumetric capacity is maintained by suitable deformation and stretching of the tubular spring members 31U, 31L. The additional energy required to accomplish such deformation and stretching will be an additional drain on the force causing such extreme deflection and will, therefore, further assist in increasing the damping effect of the mount at extreme deflections.

An important feature of the present invention is that axial deflections of small amplitude cause a relatively large change in the relative volumetric capacities of the upper and lower chambers 35U, 35L. This is accomplished by the fact that deformations of the resilient material of the spring members 31U, 31L and the spring collar 23 (the throttling collar 39 in the second embodiment) accelerate a decrease of the volumetric capacity of one of the chambers 35U, 35L while accelerating an increase of the volumetric capacity of the other. This acceleration of change in relative volumetric capacities is particularly advantageous where a hydraulic medium of low viscosity is used as it results in a more rapid flow of the medium through the restricted orifices and, hence, a greater absorption of energy. Low viscosity liquids may sometimes be preferred because they may be more satisfactory over greater temperature ranges.

As already indicated, the damping characteristics of the embodiments described herein may be modified so as to follow optimum values by changing the hydraulic action during deflection, by varying the orifices through which the hydraulic medium must flow between the two chambers 35U, 35L. Two possible means for doing this have been shown, but it will be understood that other means of varying the orifices may be used.

A preferred hydraulic medium for the first embodiment described (Figures 1-5) is a suitable fluid such as oil. However, it may sometimes be advisable to use a hydraulic fluid combined with a small amount of air or other gas. In some installations, this would be helpful during extreme deflections when the combined volumetric capacity of the chambers 35U, 35L, 37 might tend to decrease. A compressible gas will then relieve excessive pressures. A compressible gas would also help to compensate for pressure changes due to temperature variations.

The size and number of the fixed orifices 15 and variable orifices 29U, 29L will, of course, be determined by various factors, including the viscosity and type of hydraulic medium being used, the load ratings of the mounts, etc.

The tubular spring members 31U, 31L may be secured directly to the load plates 21U, 21L if a suitable means for accomplishing this is worked out. However, in the embodiments described above, manufacturing procedures dictated that said spring members 31U, 31L be secured to the washers 33U, 33L which, in turn, are secured respectively to the load plates 21U, 21L.

Although the embodiments shown in the drawings have particular geometries, it will be understood that various changes in geometry may be made within the spirit of the invention. Such changes in geometry and relative sizes of elements, and other modifications, may be made to suit the present mounting to different compounds of natural or synthetic rubber, to different hydraulic mediums and to different loading values.

Although not shown in the illustrated embodiments, it would be advisable to incorporate means for injecting the hydraulic medium into the chambers 35U, 35L, 37 after the mountings are assembled.

Although a particular mount will obviously be designed with certain loads and vibrations and shocks in mind, it is conceivable that in use a mount may be subjected to unanticipated conditions or it may be used beyond the intended useful life span of its resilient material. Should this occur the resilient material may rupture or the bonds between one of the spring members 31U, 31L and the washers 33U, 33L or the base plate 11 may let go. Nevertheless, the load will not separate from the base and fly into space as the base plate 11 is imprisoned upon the load spool 19.

It will be understood that the mounts described will also operate with the base plates secured to a load and the load spools secured to a base.

While there have been described what at present are considered two preferred embodiments of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A mounting comprising a base plate; a load member including first and second load plates on opposite sides of said base plate and spaced therefrom and substantially parallel thereto; means joining said load plates to maintain them in substantially fixed disposition relative to each other; a first spring member interposed between the base plate and said first load plate, its axis being substantially normal to said plates, said spring member being tubular in shape, of a springy flexible material, and bowed inwardly at its central portion, and its ends being secured respectively to the said base plate and first load plate; a first hydraulic chamber formed within said first spring member and between said base plate and said first load plate; a second spring member of similar material, and shape and similarly disposed between the base plate and the second load plate; a second similar hydraulic chamber formed on the opposite side of the base plate from the first chamber; restricted orifice means interconnecting said hydraulic chambers; and a hydraulic medium in said chambers; so that upon movements of the base plate substantially longitudinal of the said spring members, one spring member will be subjected to flexure and hydraulic medium will be caused to flow through the restricted orifice means.

2. A mounting comprising a base plate; an opening therethrough; a load spool, including a core extending through the opening aforesaid and substantially normal to the base plate, and first and second load plates rigidly secured to said core and substantially normal to said core and disposed on opposite sides of the base plate; first and second spring members, each such spring member being of springy flexible material, tubular in shape and bowed inwardly at its central portion, so that it will be subjected to flexure upon any longitudinal shortening thereof, said spring members being disposed on opposite sides of the base plate, said first spring member being secured at one end to the base plate and at its other end to said first load plate, and said second spring member being secured at one end to the base plate and at its other end to said second load plate; a spring collar of springy flexible material, shaped substantially like a tire, encircling said core, and secured substantially at its outer periphery to the inner marginal portion of said base plate, its walls being bowed outwardly so that they will be subjected to flexure upon any shortening in a radial direction of any sector thereof; first and second hydraulic chambers, said first chamber formed within the first spring member and between the base plate and the first load plate and said second chamber formed within the second spring member and between the base plate and the second load plate; a hydraulic medium within said chambers; and restricted orifice means interconnecting said two chambers; so that upon any movement of the base plate relative to the load spool in a substantially axial direction, one of the spring members will be subjected to flexure and hydraulic medium will be caused to flow between said chambers through the restricted orifice means, and upon any substantially lateral movement of the base plate relative to the load spool, the walls of the collar at one sector thereof will be subjected to flexure.

3. The mounting as set forth in claim 2 wherein additional restricted orifice means interconnect the chambers and extend through the collar.

4. The mounting as set forth in claim 2 wherein the restricted orifice means include at least one restricted aperture extending through the collar; and the parts are so proportioned that, upon relatively large deflections of the base plate relative to the load spool in a substantially axial direction, the collar will be squeezed against one of the load plates and said aperture through the collar will be varied in size.

5. The mounting as set forth in claim 2 wherein the collar is made up of a permeable material.

6. A mounting comprising a base plate; an opening therethrough; a load spool, including a core extending through the opening aforesaid and substantially normal to the base plate, and first and second load plates rigidly secured to said core and substantially normal to said core and disposed on opposite sides of the base plate; first and second spring members, each such spring member being of springy flexible material, tubular in shape and bowed inwardly at its central portion, so that it will be subjected to flexure upon any longitudinal shortening thereof, said spring members being disposed on opposite sides of the base plate, said first spring member being secured at one end to the base plate and at its other end to said first load plate, and said second spring member being secured at one end to the base plate and at its other end to said second load plate; a spring collar of springy flexible permeable material, shaped substantially like a tire, encircling said core, and secured substantially at its outer periphery to the inner marginal portion of the base plate, its walls being bowed outwardly so that they will be subjected to flexure upon any shortening in a radial direction of any sector thereof; first and second hydraulic chambers, said first chamber formed within said first spring member and between the base plate and said first load plate and said second chamber formed within the second spring member and between the base plate and the second load plate; a hydraulic medium within said chambers; and restricted orifice means extending through the collar interconnecting the two chambers; so that upon any movement of the base plate relative to the load spool in a substantially axial direction, one of the spring members will be subjected to flexure and hydraulic medium will be caused to flow between said chambers through the restricted orifice means, and upon any substantially lateral movement of the base plate relative to the load spool, the walls of the collar at one sector thereof will be subjected to flexure.

7. A mounting comprising a base plate having an opening therethrough; a load spool, including a core extending through the opening aforesaid and substantially normal to said base plate, and first and second load plates rigidly secured to said core and substantially normal to said core, said two load plates being disposed on opposite sides of said base plate; first and second spring members, each such spring member being of springy flexible material, tubular in shape and bowed inwardly at its central portion so as to be subjectable to flexure upon any longitudinal shortening thereof, said two spring members being disposed on opposite sides of the base plate, said first spring member being secured at one end to the base plate and at the other end to said first load plate, and said second spring member being secured at one end to the base plate and at the other end to said second load plate; a spring collar of springy flexible material shaped substantially like a tire encircling the core aforementioned and secured substantially at its outer periphery to the inner marginal portion of said base plate, its walls being bowed outwardly so as to be subjectable to flexure upon any shortening in a radial direction of any sector thereof; first and second hydraulic chambers, said first chamber formed within said first spring member and between the base plate and said first load plate, and said second formed within the second spring member and between the base plate and the second load plate; a hydraulic medium within said chambers; and restricted orifice means extending through the spring collar and interconnecting the two chambers aforesaid; so that, upon any movement of the base plate relative to the load spool in a substantially axial direction, one of the spring members is subjected to flexure and hydraulic medium is caused to flow between said chambers through the restricted orifice means, and, upon any substantially lateral movement of the base plate relative to the load spool, the walls of the collar at one sector thereof are subjected to flexure.

8. In a mounting a base plate having an opening therethrough; a load spool, including a core extending through the opening aforesaid and substantially normal to said base plate, and first and second load plates rigidly secured to said core and substantially normal to said core, said two load plates being disposed on opposite sides of said base plate; a spring collar of springy flexible material shaped substantially like a tire encircling the core aforementioned and secured, substantially at its outer periphery to the inner marginal portion of the base plate aforementioned, its walls being bowed so as to be subjectable to flexure upon any shortening in a radial direction of any sector thereof; first and second hydraulic chambers, said two chambers disposed on opposite sides of the base plate; a hydraulic medium within said chambers; and restricted orifice means extending through the spring collar and interconnecting said two chambers; so that, upon any movement of the base plate relative to the load spool in a substantially axial direction, said hydraulic medium is caused to flow between the said chambers through the restricted orifice means, and, upon any substantially lateral movement of the base plate relative to the load spool, the walls of the collar at one sector thereof are subjected to flexure.

9. In a mounting, a spring collar of springy flexible material shaped substantially like a tire, its wall being bowed so as to be subjectable to flexure upon any shortening in a radial direction of any sector thereof, two hydraulic chambers, a hydraulic medium within said chambers and restricted orifice extending through the spring collar and interconnecting said two chambers.

10. A mounting comprising, a base plate, a load member including first and second load plates, said two load plates being on opposite sides of said base plate and spaced therefrom and substantially parallel thereto, means joining said load plates to maintain them in substantially fixed disposition relative to each other, a first spring member interposed between the base plate and said first load plate, a second spring member interposed between said base plate and said second load plate, the operational axes of said spring members being substantially normal to said plates, said spring members being of such material and configuration as to go into flexure upon axial shortening thereof, a first hydraulic chamber formed between said base plate and said first load plate, a second hydraulic chamber formed between said base plate and said second load plate, restricted orifice means interconnecting said hydraulic chamber, and a hydraulic medium in said chambers; so that upon movements of the base plate toward one of said load plates, the spring member between the base plate and said load plate will flex and the hydraulic medium will be caused to flow through the restricted orifice means.

11. A mounting as defined in claim 1, wherein the restricted orifice means consist of openings extending through the base plate.

NORMAN E. LEE.

REFERENCES CITED

The following references are of record in the file of this patent:

UNITED STATES PATENTS

| Number | Name | Date |
|---|---|---|
| 1,915,303 | Forsyth | June 27, 1933 |
| 2,226,605 | Geyer et al. | Dec. 31, 1940 |